United States Patent
Allier et al.

(10) Patent No.: US 12,467,867 B2
(45) Date of Patent: Nov. 11, 2025

(54) METHOD FOR ESTIMATING A THREE-DIMENSIONAL SPATIAL DISTRIBUTION OF FLUORESCENCE, INSIDE AN OBJECT

(71) Applicant: Commissariat a l'Energie Atomique et aux Energies Alternatives, Paris (FR)

(72) Inventors: Cédric Allier, Grenoble (FR); Lionel Herve, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 183 days.

(21) Appl. No.: 18/147,772

(22) Filed: Dec. 29, 2022

(65) Prior Publication Data

US 2023/0221255 A1 Jul. 13, 2023

(30) Foreign Application Priority Data

Dec. 29, 2021 (FR) ...................................... 2114627

(51) Int. Cl.
*G01N 21/64* (2006.01)
*G06T 17/20* (2006.01)
*G01N 21/17* (2006.01)

(52) U.S. Cl.
CPC ..... *G01N 21/6456* (2013.01); *G01N 21/6458* (2013.01); *G06T 17/20* (2013.01);
(Continued)

(58) Field of Classification Search
CPC ..... G01N 2021/174; G01N 2021/1765; G01N 2021/1782; G01N 2021/1785;
(Continued)

(56) References Cited

U.S. PATENT DOCUMENTS 7,616,985 B2 * 11/2009 Stearns ............... G01N 21/6456
600/407
7,652,764 B2 * 1/2010 Herve ................... G06T 11/006
600/425
(Continued)

FOREIGN PATENT DOCUMENTS

EP        1 971 258 A2    9/2008
WO    WO 2011/038006 A1    3/2011

OTHER PUBLICATIONS

French Preliminary Search Report and Written Opinion Issued Aug. 4, 2022 in French Application 21 14627 filed on Dec. 29, 2021 (with English Translation of Categories of Cited Documents), 10 pages.

*Primary Examiner* — Allen C. Ho
(74) *Attorney, Agent, or Firm* — Oblon, McClelland, Maier & Neustadt, L.L.P.

(57) ABSTRACT

The invention describes an iterative reconstructing method allowing a spatial distribution of fluorescence in an object to be obtained. The method comprises acquiring images of fluorescence in various planes at various depths in the object, so as to form a three-dimensional acquired image. It comprises an iterative reconstructing algorithm with, in each iteration, an initial fluorescence distribution or a fluorescence distribution resulting from a preceding iteration being taken into account, and the fluorescence light wave propagating through the object being simulated, so as to obtain a reconstruction of the acquired image. The acquired image, or a differential image corresponding to a comparison between the acquired image and the reconstructed image, is then back-propagated through the object, so as to update the fluorescence distribution. FIG. 5B.

11 Claims, 8 Drawing Sheets

(52) U.S. Cl.
CPC .............. *G01N 2021/174* (2013.01); *G01N 2021/1765* (2013.01); *G01N 2021/1782* (2013.01); *G01N 2021/1785* (2013.01); *G01N 2021/1787* (2013.01); *G01N 2021/646* (2013.01)

(58) Field of Classification Search
CPC ........... G01N 21/6456; G01N 21/6458; G01N 2021/646; G01N 2021/1787
USPC .............................................. 250/332, 459.1
See application file for complete search history.

(56) References Cited

U.S. PATENT DOCUMENTS

| | | | | |
|---|---|---|---|---|
| 7,675,044 | B2* | 3/2010 | Laidevant | G01N 21/6456 250/459.1 |
| 7,821,640 | B2* | 10/2010 | Koenig | A61B 5/0073 356/417 |
| 8,193,518 | B2* | 6/2012 | Herve | G01N 21/4795 250/459.1 |
| 8,401,618 | B2* | 3/2013 | Lorenzo | A61B 5/0073 600/425 |
| 8,401,619 | B2* | 3/2013 | Lorenzo | G01N 21/6486 600/425 |
| 10,379,027 | B2* | 8/2019 | Allier | G01N 21/4788 |
| 10,481,076 | B2* | 11/2019 | Allier | G06V 20/693 |
| 10,564,602 | B2* | 2/2020 | Allier | G03H 1/0866 |
| 10,816,454 | B2* | 10/2020 | Herve | G01N 15/1433 |
| 10,845,286 | B2* | 11/2020 | Allier | G01N 15/1429 |
| 10,848,683 | B2* | 11/2020 | Cioni | G02B 21/367 |
| 10,908,060 | B2* | 2/2021 | Allier | G03H 1/0866 |
| 11,199,488 | B2* | 12/2021 | Blandin | G01N 15/1433 |
| 11,385,158 | B2* | 7/2022 | Blandin | G06T 7/62 |
| 11,386,594 | B2* | 7/2022 | Herve | G06T 11/005 |
| 11,555,774 | B2* | 1/2023 | Bordy | G03H 1/0866 |
| 11,592,435 | B2* | 2/2023 | Herve | G03H 1/0866 |
| 12,019,397 | B2* | 6/2024 | Zelsmann | G03H 1/0443 |
| 12,135,273 | B2* | 11/2024 | Blandin | G01N 15/1468 |
| 12,339,215 | B2* | 6/2025 | Allier | G01N 15/1433 |
| 2004/0021771 | A1 | 2/2004 | Stearns et al. | |
| 2005/0201614 | A1 | 9/2005 | Rice et al. | |
| 2008/0018899 | A1 | 1/2008 | Stearns et al. | |
| 2009/0005676 | A1 | 1/2009 | Koenig et al. | |
| 2010/0022872 | A1 | 1/2010 | Stearns et al. | |
| 2011/0068280 | A1 | 3/2011 | Herve et al. | |
| 2011/0090316 | A1 | 4/2011 | Stearns et al. | |
| 2011/0184277 | A1 | 7/2011 | Ripoll Lorenzo et al. | |
| 2012/0211671 | A1 | 8/2012 | Herve et al. | |
| 2013/0281842 | A1 | 10/2013 | Lorenzo et al. | |

* cited by examiner

METHOD FOR ESTIMATING A THREE-DIMENSIONAL SPATIAL DISTRIBUTION OF FLUORESCENCE, INSIDE AN OBJECT

TECHNICAL FIELD

The technical field of the invention is three-dimensional location of fluorescent regions in an object.

PRIOR ART

Fluorescence imaging is a technique that allows fluorescent markers to be located in a human or animal body. One of the main applications is location of fluorescent markers, or fluorophores, the latter targeting cells of interest, cancerous cells for example. The protocol consists in injecting these markers into the organism before an examination by fluorescence imaging. Because it makes it possible to acquire an image indicating the location of various cancerous regions, fluorescence imaging is a useful complement, or even an alternative, to the use of radioactive tracers.

In the field of microscopy, one difficulty encountered in the reconstruction of the fluorescence is the spatial distribution of the refractive index of the sample, which may not be uniform, in particular when the sample is a real biological tissue. Specifically, biological samples exhibit non-uniformities in refractive index, for example at walls or other cellular structures (cell membrane, nucleus). In culture media, such non-uniformities appear at the interface between the cells and the culture medium.

One solution, aiming to limit the influence of the non-uniformity in refractive indices, consists in using a clarifying agent. The latter may be a membrane-destroying solvent. Such a method makes it possible to obtain 3D images of fluorescence that do not suffer from the non-uniformity in refractive index. However, use of a clarifying agent is invasive and does not allow a sample to be followed in real time.

The inventor has provided a method for reconstructing the spatial distribution of fluorescence in a sample, that does not require a clarifying agent to be used. It is a non-invasive method, that does not affect the integrity of the sample. The method described below makes it possible to account for a measured non-uniform spatial distribution of refractive indices, said spatial distribution being assumed to be known. It may for example have been obtained beforehand using optical diffraction tomography.

SUMMARY OF THE INVENTION

A first subject of the invention is a method for reconstructing a three-dimensional spatial distribution of fluorescence inside an object, the object emitting fluorescence light under the effect of illumination in an excitation spectral band, the object being discretized into object voxels, such that:
  each object voxel is capable of emitting light in a fluorescence spectral band; the three-dimensional spatial distribution of fluorescence defines an intensity of emission of fluorescence light in each object voxel;
  the method comprising the following steps:
  a) placing the object facing an image sensor, the image sensor being configured to form an image in an object focal plane, the object focal plane being configured to lie successively at various depths in the object;
  b) illuminating the object in the excitation spectral band, and successively acquiring a plurality of elementary images, the object focal plane respectively lying at the various depths in the object, each image being divided into pixels, to each pixel corresponding one measured intensity value, the elementary images forming a three-dimensional acquired image, each pixel of an elementary image forming one image voxel of the three-dimensional acquired image;
  c) initializing the fluorescence spatial distribution;
  d) taking into account the initial fluorescence spatial distribution or the fluorescence distribution resulting from a preceding iteration;
  e) assigning a random phase value to each object voxel, and implementing an algorithm modelling propagation of light through the object, so as to estimate a complex amplitude of the light wave detected by each image voxel;
  f) repeating step e) W times, W being a positive integer, so as to obtain, for each image voxel, W complex-amplitude estimates;
  g) for each image voxel, on the basis of the W estimates resulting from step f), computing a reconstructed intensity, all of the reconstructed intensities of each image voxel together forming a reconstructed image;
  h) optionally forming a differential image, the differential image corresponding to a comparison between the reconstructed image and the acquired image;
  i) assigning a random phase value to each image voxel of the acquired image resulting from step g) or of the differential image resulting from step h), and implementing an algorithm modelling back-propagation of light through the object, so as to obtain, for each object voxel:
  a complex fluorescence-emission amplitude corresponding to the reconstructed image resulting from step g);
  or a complex differential fluorescence-emission amplitude corresponding to the differential image resulting from step h);
  j) repeating step i) W times, W being a positive integer, so as to obtain, for each object voxel, W complex-amplitude estimates corresponding to the reconstructed image or W differential complex-amplitude estimates corresponding to the differential image;
  k) on the basis of the W estimates resulting from step j), computing, for each object voxel, an emission intensity or a differential emission intensity;
  l) updating the spatial distribution of fluorescence in the object on the basis of the emission intensity or of the differential emission intensity computed for each voxel of the object in step k);
  m) reiterating steps d) to l) until a criterion of stoppage of the iterations is met.

According to one embodiment, the method comprises, in each iteration, the following steps:
  l-a) assigning a random phase value to each image voxel of the image acquired in step b), and implementing an algorithm modelling back-propagation of light through the object, so as to estimate, for each object voxel, a complex fluorescence-emission amplitude corresponding to the acquired image;
  j-a) repeating step i-a) W" times, W" being a positive integer, so as to obtain, for each object voxel, W" estimates of complex fluorescence-emission amplitudes corresponding to the acquired image;

k-a) on the basis of the W" estimates resulting from step j-a), computing an emission intensity, for each object voxel, corresponding to the acquired image;

the method being such that, in step 1), the update is carried out on the basis of a ratio, computed for each object voxel, between the emission intensity corresponding to the acquired image and the emission intensity corresponding to the reconstructed image.

In each repetition of step i-a), the phase value assigned to each image voxel of the acquired image may correspond to the phase value assigned to the same image voxel of the image reconstructed in a step i) of the same iteration.

In each step k-a), for each object voxel, the emission intensity may be computed on the basis of a mean of the W" emission intensities estimated, for said object voxel, in each step i-a).

According to one embodiment:

in step h), the differential image is a quadratic difference between the reconstructed image and the acquired image;

each step i) comprises obtaining, for each image voxel, a differential complex amplitude computed on the basis of the differential image;

step k) comprises computing a differential emission intensity, for each object voxel, corresponding to the differential image computed in step h);

in step l), the spatial distribution of fluorescence in the object is updated so as to minimize the differential emission intensity of the object voxels.

Preferably, in each step g), for each image voxel, the reconstructed intensity is computed on the basis of a mean of the square of the moduli of the W complex-amplitude estimates obtained, for said image voxel, in each step e);

in each step k), for each object voxel, the emission intensity is computed on the basis of a mean of the square of the moduli of the W estimates of complex fluorescence-emission amplitude obtained, for said object voxel, in each step j).

According to one possibility:

in each step e), a wavelength is assigned to each object voxel, in the fluorescence spectral band, the wavelength being assigned randomly or according to a predetermined probability distribution;

in each step i), a wavelength is assigned to each image voxel, in the fluorescence spectral band, the wavelength being assigned randomly or according to a predetermined probability distribution.

In step e) and in step i), the algorithm modelling propagation of light may employ a one-way propagation model, of BPM type, BPM standing for beam propagation method, so as to determine light propagating through a voxel on the basis of light propagating from an adjacent voxel. The refractive index of the object may vary between two different object voxels. The algorithm modelling propagation of light then accounts for a variation in refractive index between two adjacent object voxels.

A second subject of the invention is a device for observing an object, the device comprising:

an image sensor, configured to form an image in an object plane, the distance between the image sensor and the object plane being variable;

a light source, configured to illuminate an object;

a processing unit, configured to receive images acquired by the image sensor, and to implement steps c) to l) of a method according to the first subject of the invention.

A third subject of the invention is a storage medium able to be read by a computer or able to be connected to a computer, the storage medium being configured to implement steps c) to m) of a method according to the first subject of the invention on the basis of images formed by an image sensor at various depths in an object.

The invention will be better understood on reading the text describing examples of embodiment that are given, in the rest of the description, with reference to the figures listed below.

FIGURES

Figure 2:
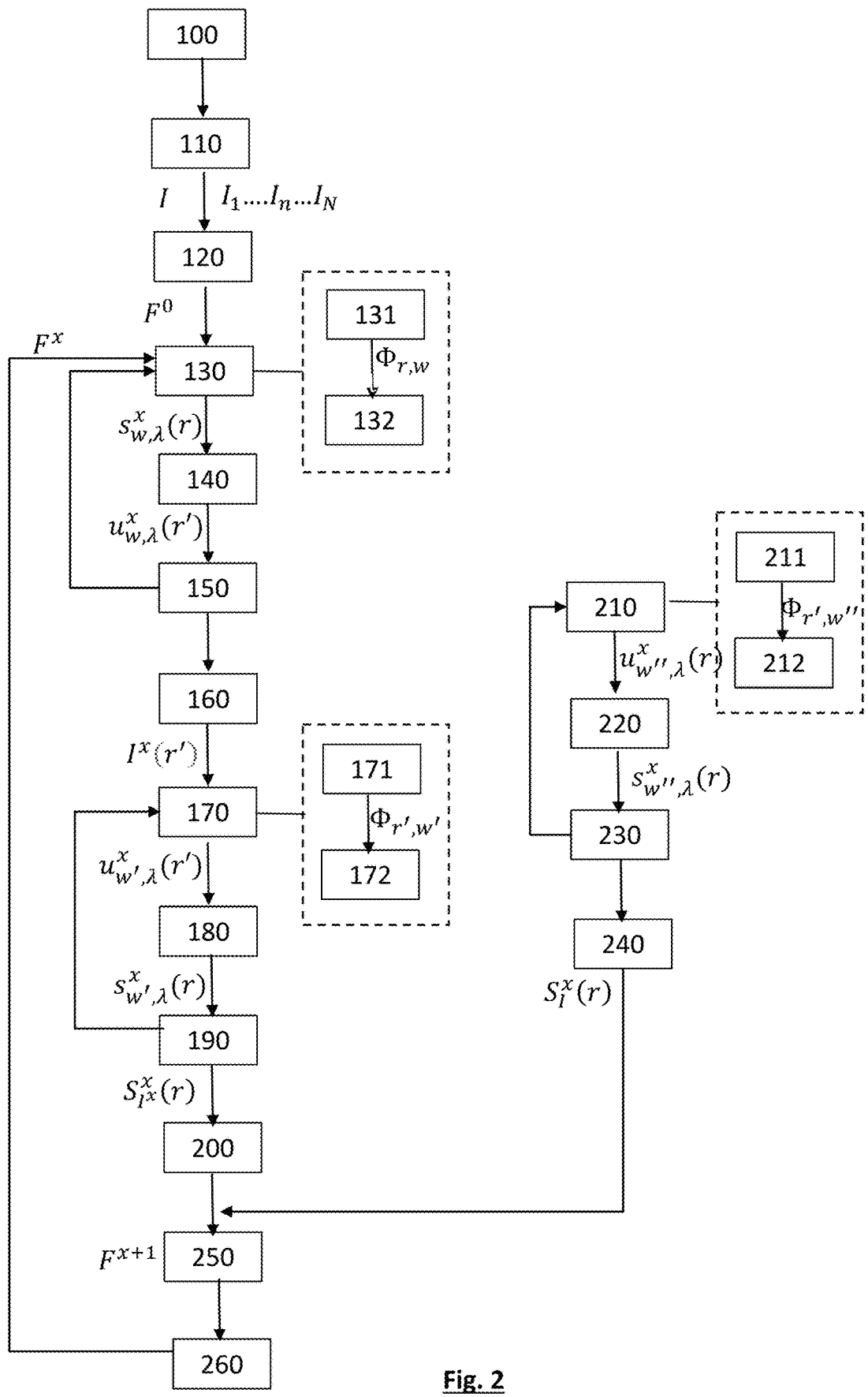

FIG. 2 schematically shows the main steps of a method according to the invention.

Figure 3:
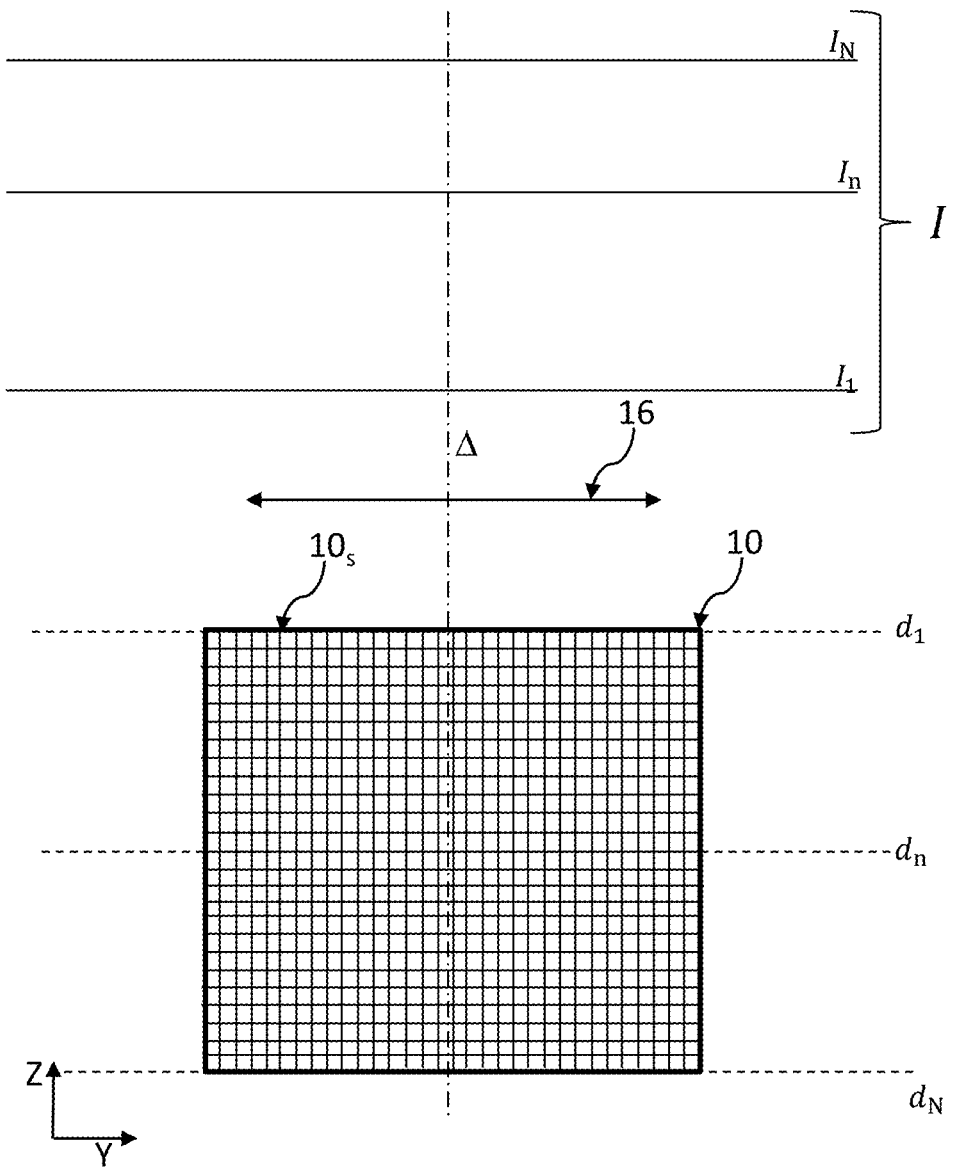

FIG. 3 illustrates the acquisition of images at depth, in the object, and the formation of a three-dimensional image.

Figure 4:
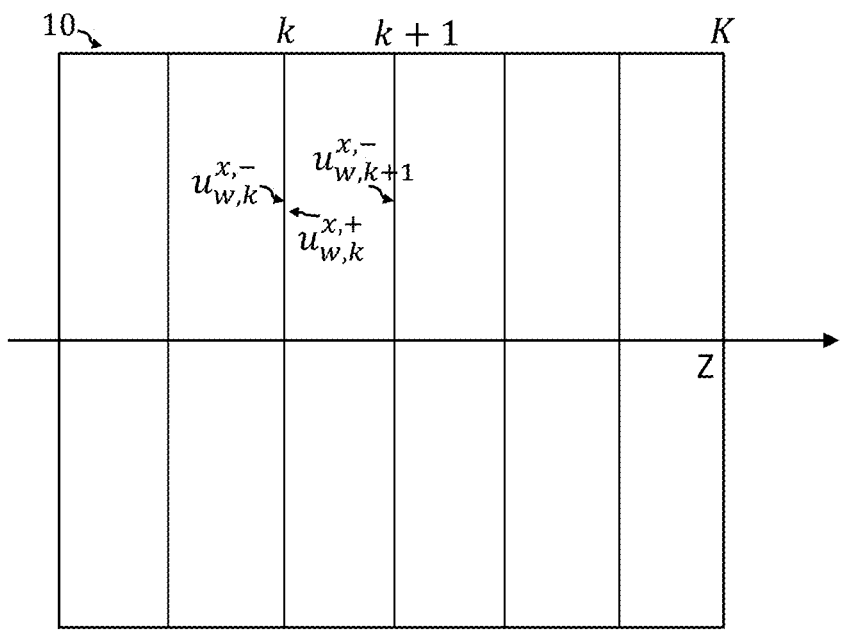

FIG. 4 schematically shows an algorithm modelling beam propagation through the object.

Figure 5A:
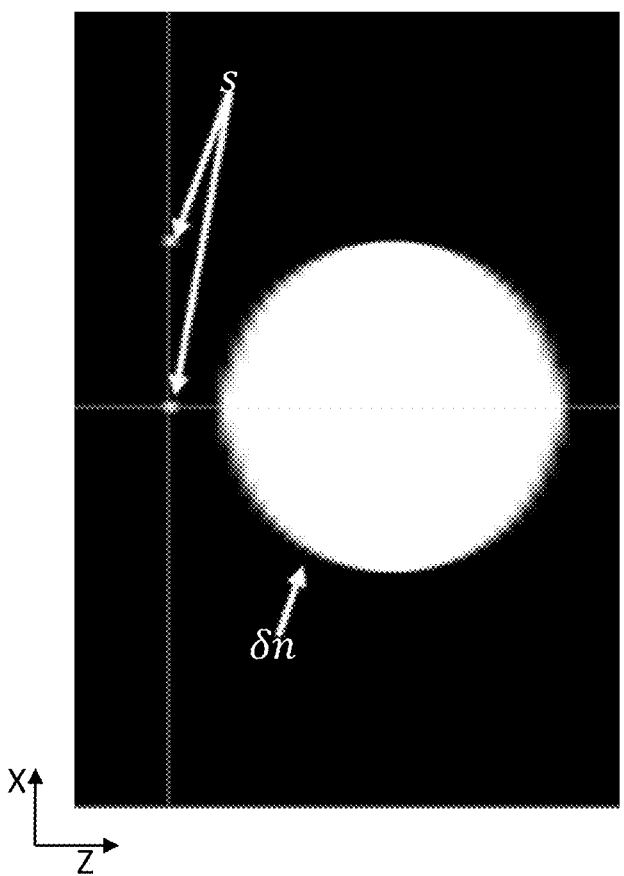

FIG. 5A shows a cross section of an object used to perform experimental trials.

Figure 5B:
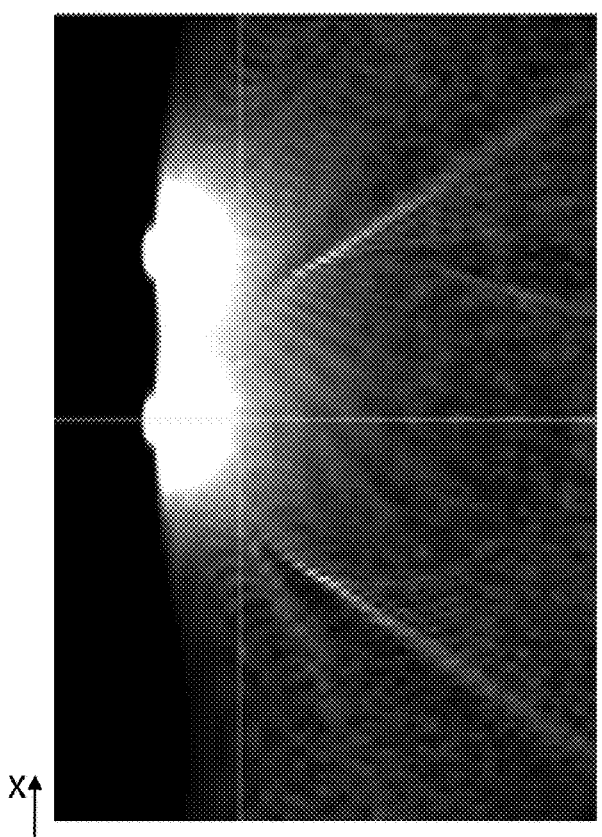

FIG. 5B shows a result of application of the algorithm modelling beam propagation through the object.

Figure 5C:
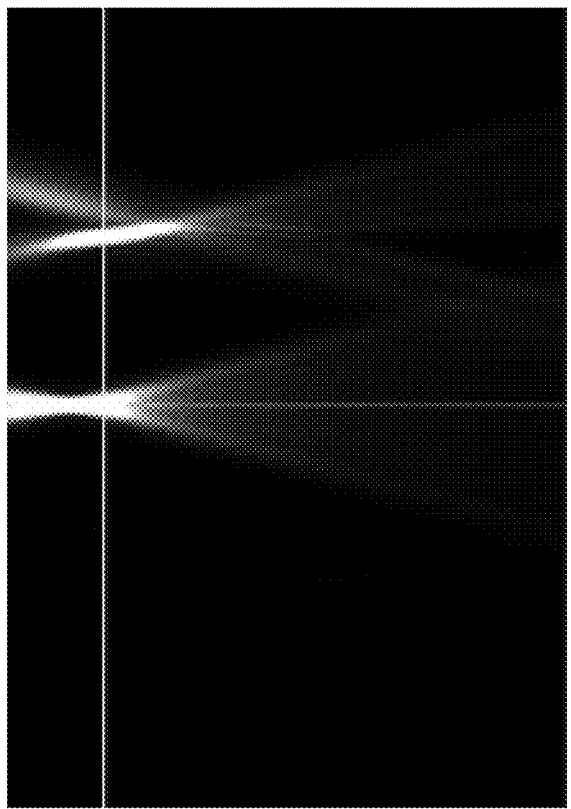

FIG. 5C shows a cross section of a three-dimensional image of the object.

Figures 5D, 5E:
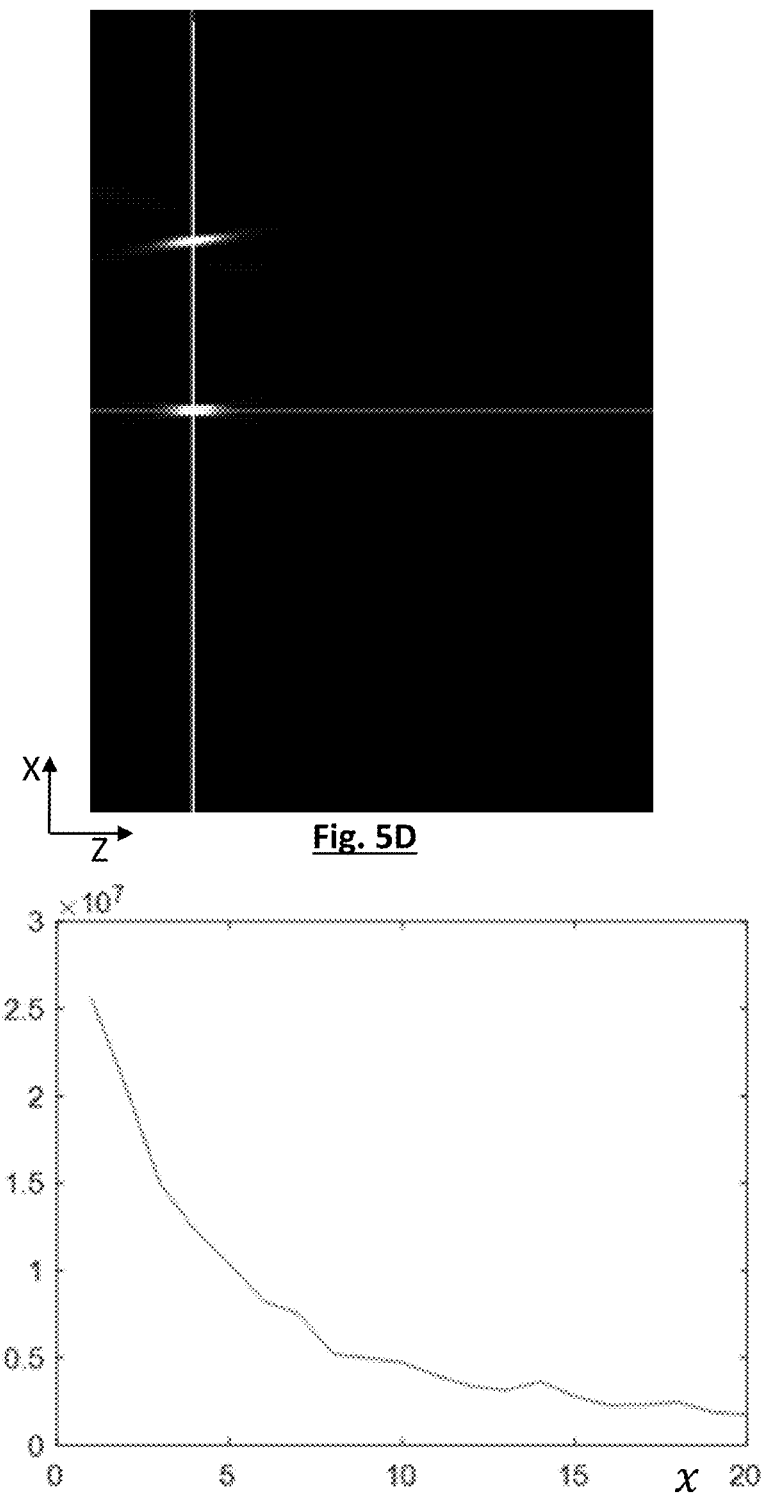

FIG. 5D shows a spatial distribution of fluorescence in the object, resulting from implementation of the method described with reference to FIG. 2.

FIG. 5E shows the variation in an indicator of fit to the data as a function of algorithm iterations.

Figure 5F:
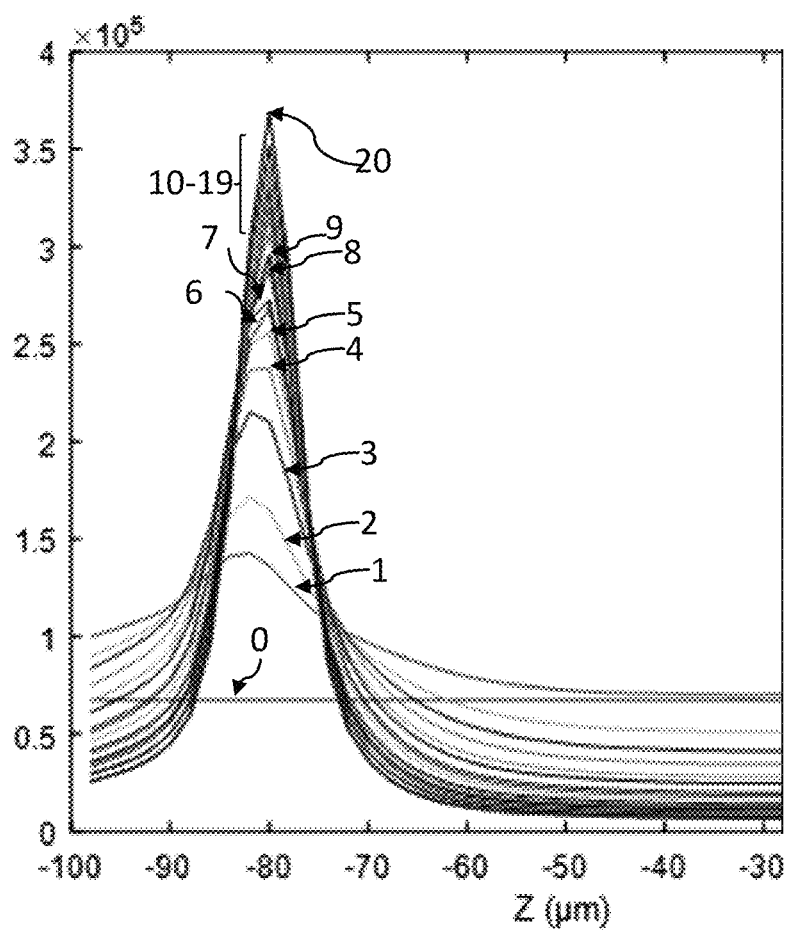

FIG. 5F shows the variation in the fluorescence intensity of the fluorescence distribution, summed through the depth of the object, in the course of the successive iterations.

DESCRIPTION OF PARTICULAR EMBODIMENTS

Figure 1A:
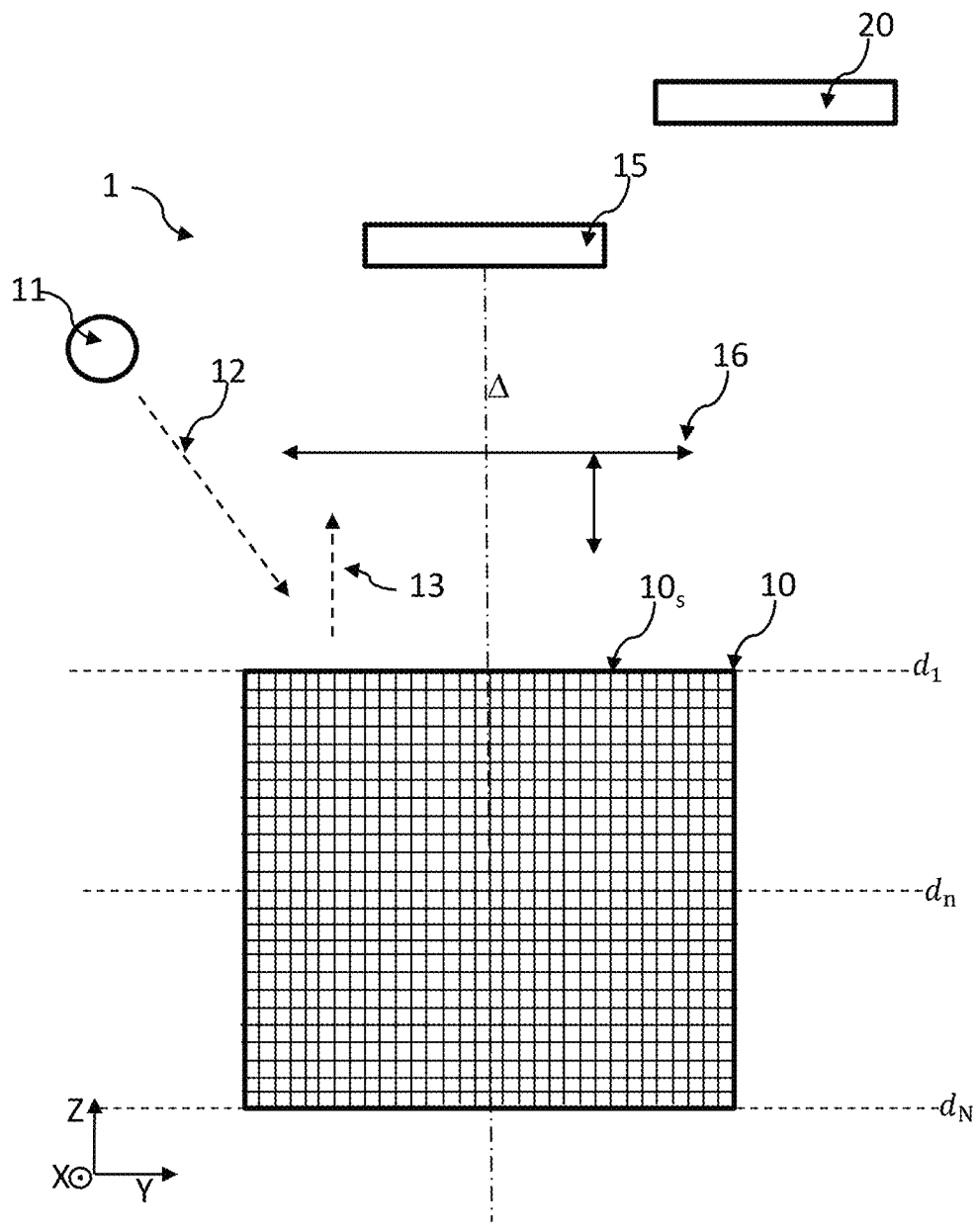
FIG. 1A shows an example of a device allowing the invention to be implemented.

FIG. 1A shows a device 1 allowing the invention to be implemented. The device comprises a light source 11, configured to illuminate an object 10. The object is a solid volume taking the form of a gel, that it is desired to analyse. Under the effect of illumination by the light source, the object emits emitted light. The light source emits illuminating light 12 in an illumination spectral band. Some of the light emitted by the light source propagates through the object. Under the effect of the illumination, the object emits fluorescence light 13.

The light source 11 may be a laser source or a light-emitting diode. The light source 11 may be fibre-coupled, the light emitted by the light source 11 being guided to the object with an optical fibre.

The object 10 is capable of containing fluorophores, which emit fluorescence light, in a fluorescence spectral band, when they are illuminated in an excitation spectral band. When the illumination spectral band of the light source is comprised in the excitation spectral band, the object emits fluorescence light in a fluorescence spectral band. The analysis of the object 10 aims to determine the position of the fluorophores in the object. To do this, it is sought to determine a three-dimensional spatial distribution of emission of the fluorescence light inside the object 10, so as to be able to identify regions of the object 10 containing a high concentration of fluorophores.

The object 10 is for example a biological tissue, that it is desired to analyse in order to identify singularities, should any be present. The objective is to identify local concentrations of fluorophores in the object 10, said concentrations being able to be used to assist with determination of a pathological state.

The object 10 is discretized into voxels, which are referred to as "object voxels". Each object voxel corresponds to an elementary volume of the object. It may for example be a question of a volume from 100 nm×100 nm to 10 µm×10 µm. In each object voxel, the object has a refractive index, in the fluorescence spectral band. The refractive index may be non-uniform, and vary between one object voxel and another object voxel. Non-uniformity in refractive index is common when the object is a biological sample. Below, each object voxel is designated by a three-dimensional coordinate r.

The device 1 comprises a pixelated image sensor 15, configured to form an image of the object 10. The image sensor 15 is coupled to an optical system 16, the latter allowing an object plane, called the focal plane, to be conjugated with the image sensor 15. The image sensor 15 and the optical system 16 are aligned along an optical axis Δ. The assembly formed by the image sensor and the optical system 16 is configured so that the focal plane can be translated parallel to the optical axis Δ. The optical system 16 may comprise an objective and a tube lens. The image sensor 15 may be a CMOS sensor. The focal plane may thus be translated to various depths inside the object.

Alternatively, the image sensor 15 is associated with a confocal diaphragm, the latter allowing various slices of the object to be observed in succession.

Thus, generally, the image sensor 15 is configured to acquire images in various planes, lying at various depths in the object. The object 10 is bounded by a surface 10s, forming an interface between the object 10 and an ambient medium in which the image sensor lies. The ambient medium is generally air. A depth in the object corresponds to a distance with respect to the surface 10s, parallel to the optical axis Δ. The image sensor 15 may be coupled to a spectral filter, for example a band-pass filter, so as to detect a light wave in the emission spectral band.

The device 1 comprises a processing unit 20, arranged to process the images formed by the image sensor, so as to estimate the three-dimensional, spatial distribution of emission of fluorescence light in the object 10.

The light source 11 is configured to emit illuminating light 12, which propagates through the object 10. The illuminating light lies in an illumination spectral band in which the object 10 has a non-zero transmittance. The illumination spectral band corresponds or is comprised in the excitation spectral band of the fluorophores liable to be present in the object 10.

One difficulty is that fluorescence is an incoherent effect. Under the effect of illumination in the excitation spectral band, two different fluorophores generally emit incoherent light waves, forming the fluorescence light. This happens even if the exciting light is coherent.

Another difficulty is the non-uniformity in the refractive index of the object. In prior-art methods, the spatial distribution of emission of fluorescence is obtained by inverting an equation such as:

$$I = PSF \times F \quad (1)$$

where

F corresponds to a vector each term I(r) of which is the fluorescence intensity in an object voxel of three-dimensional coordinate r: this corresponds to what it is sought to estimate.

I is a fluorescence image formed by the image sensor: this corresponds to a measurement;

PSF (Point Spread Function) is a matrix representative of the response of the instrument: this matrix is established by modelling and may be adjusted through experimental trials.

Such a formula is valid if the refractive index is uniform or not very non-uniform. The assumption of refractive-index uniformity is acceptable when the thickness of the object is small, or when the object is treated beforehand with a clarifying agent, allowing refractive-index uniformity to be increased to a certain extent inside the object. The clarifying agent is usually a solvent that destroys the cell membranes or even the nuclei of cells. This allows the effects of index jumps inside the object to be decreased.

The propagation of light through a medium, between an object voxel r of the object and a pixel r' of the image sensor, is modelled by:

$$U^\lambda(r') = \int G^\lambda(r',r) s^\lambda(r) dr \quad (2)$$

where:

$U^\lambda(r')$ is the complex amplitude of the light wave in image pixel r'. The complex amplitude comprises a real part and an imaginary part, the imaginary part corresponding to the phase shift.

$s^\lambda(r)$ corresponds to a complex amplitude of a light wave, in the present case a fluorescence light wave emitted by the object voxel r of the object at the wavelength λ.

$G^\lambda(r',r)$ is a complex function, allowing the complex amplitude in pixel r' to be estimated based on each object voxel r.

The complex function $G^\lambda(r, r')$ describes the transport of light between r and r'. It is obtained by solving the Helmholtz equation:

$$\Delta U^\lambda(r') + 4\pi^2 \frac{n^2}{\lambda^2} U^\lambda(r') = -s(r) \quad (3)$$

where Δ is the Laplace operator and n is the complex refractive index.

Expression (3) describes propagation of a coherent, monochromatic light wave. It is employed in prior-art reconstructing methods.

The intensity measured by the pixel of an image sensor located at the coordinate r' is such that:

$$I(r') = \operatorname{Re} \int E[U^\lambda(r') U^{\lambda *}(r')] d\lambda \quad (4)$$

where E is an operator that returns the expected value and * is an operator that returns the complex conjugate. Integration with respect to the wavelength λ makes it possible to account for a certain spectral width of the emission of light in each object voxel r. Generally, the light emitted is not monochromatic and lies in an emission spectral band that is described by a probabilistic spectral distribution P. Each term $P^\lambda$ of the spectral distribution P is a probability of emission at the wavelength λ. The spectral distribution P is for example Gaussian.

The use of the expected value expresses the fact that the intensity is measured over a time that is long with respect to the frequency of the light wave reaching the pixel. The measured intensity corresponds to a mean of the modulus of the complex amplitude over the measurement time, i.e. the time taken by the image sensor to acquire the image.

Combining (4) and (2) gives:

$$I(r')=Re\iiint G^\lambda(r',r_1)G^{\lambda,*}(r',r_2)E[s^\lambda(r_1)s^{\lambda,*}(r_2)]d\lambda dr_1 dr_2 \quad (5)$$

where $r_1$ and $r_2$ designate object voxels.

The term $s^{\lambda,*}(r_2)$ corresponds to the complex conjugate of $s(r_2)$.

On account of the incoherent nature of the fluorescence emission, the term $E[s^\lambda(r_1)s^{\lambda,*}(r_2)]$ is zero except when $r_1=r_2$. Thus, $E[s^\lambda(r_1)s^{\lambda,*}(r_2)]$ may be written:

$$E[s^\lambda(r_1)s^{\lambda,*}(r_2)]=F(r_1)P^\lambda\delta(r_2-r_1) \quad (6)$$

$P^\lambda$ is the probability of emission at the wavelength $\lambda$ described above;

$F(r_1)$ is an intensity of emission of fluorescence in each object voxel $r_1$. The distribution F corresponds to the three-dimensional distribution of emission of fluorescence in the object, which it is sought to estimate;

$\delta$ corresponds to a Dirac distribution.

Combining (5) and (6) gives:

$$I(r')=\iint P^\lambda |G^\lambda(r',r)|^2 F(r)d\lambda dr \quad (7)$$

Expression (7) corresponds to a direct model, relating the distribution of emission intensities F to the intensity measured by pixel r'. It may be expressed in matrix form:

$$I = L\,F\,(7')$$

where

I is a vector the size of which corresponds to the number of pixels in the image, and each term of which is a fluorescence light intensity emitted by the object voxel;

L is a transfer matrix, each term of which is $P^\lambda|G^\lambda(r', r)|$;

F is a vector the size of which corresponds to the number of voxels, and each term of which is a fluorescence light intensity emitted by the object voxel.

However, the analysed object may be discretized into a large number of object voxels, a few million for example, or even a few tens or hundreds of millions. Likewise, the number of measurement points r' may be of the same order of magnitude, especially if various images of the object are formed, as described below. Thus, it is not possible to establish a transfer matrix L, at each wavelength, each term of which is equal to $P^\lambda|G^\lambda(r',r)|^2$. It would be far too great a consumption of resources. For example, if a number of object voxels r and a number of measurement points r' equal to $100\times10^6$ is considered, a transfer matrix, for each wavelength, established according to the direct model would have a size of $100\times10^6\times100\times10^6$, and is hence difficult to envisage.

The processing unit 20 is also configured to implement a reconstructing method, the main steps of which are schematically shown in FIG. 2. The objective is to estimate, iteratively, a vector F, each term F(r) of which corresponds to an emission intensity of a fluorescent light wave in an object voxel r. F is a map of the fluorescence of the object. The size of F corresponds to the number of object voxels.

The method first comprises steps allowing measured data to be obtained.

Step 100: Illuminating the Object.

In step 100, the object is illuminated by the light source 11 in an illumination spectral band. In the described example, the illumination spectral band is an excitation spectral band of a fluorophore potentially present in the object.

The object may be interposed between the light source 11 and the image sensor 15, this corresponding to an acquisition configuration that is usually designated by the expression "in transmission". Alternatively, as shown in FIG. 1A, acquisition may be performed in reflection, or after back-scattering, the light source 11 and the image sensor 15 being placed facing the object.

Figure 1B:
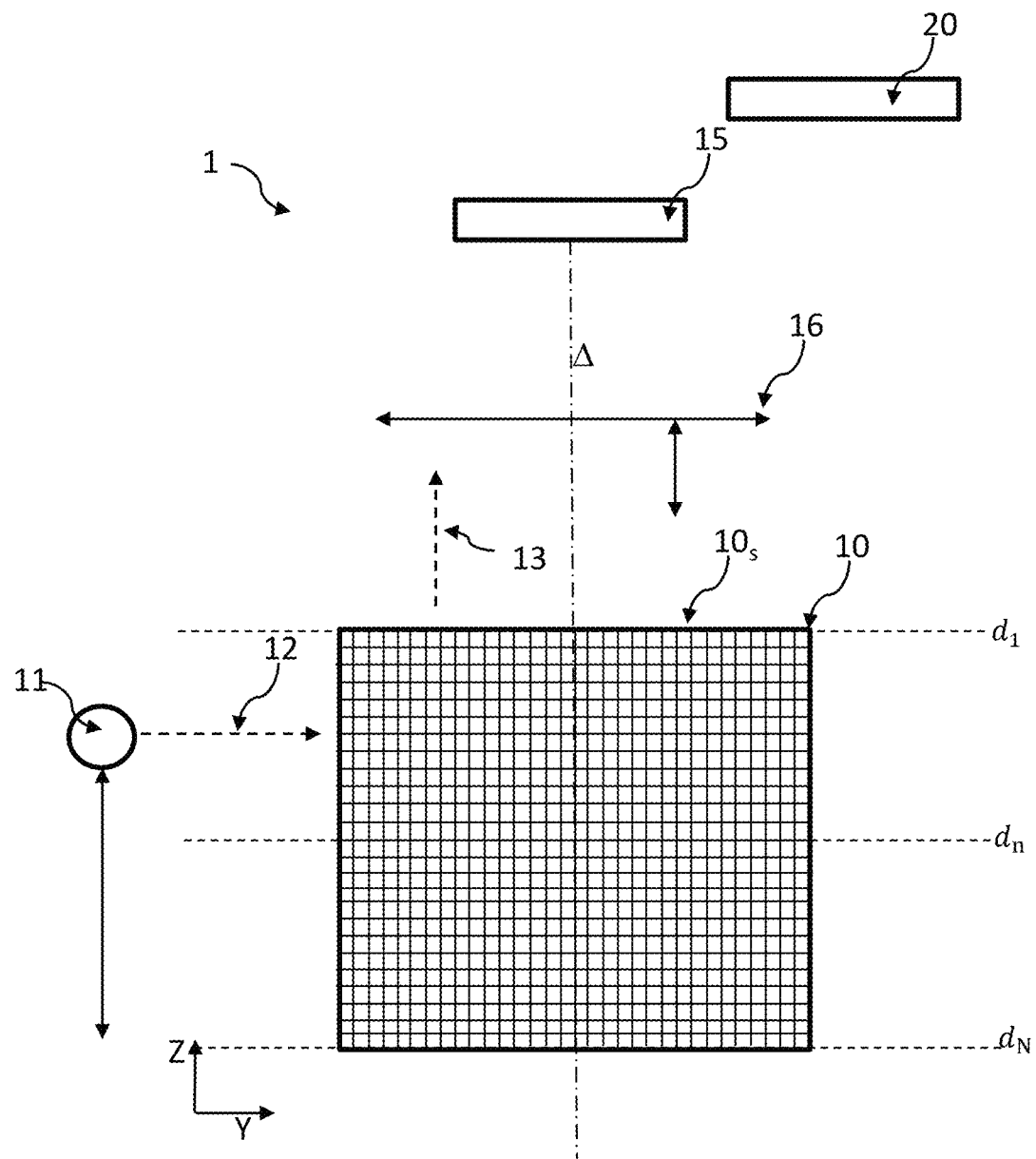
FIG. 1B shows another example of a device allowing the invention to be implemented.

According to another possibility, the light source 11 may be moveable with respect to the object during acquisition. For example, as shown in FIG. 1B, the light source 11 may generate a light beam 12 forming a narrow strip of light, perpendicular to the optical axis. The light source may then be translated parallel to the object, so as to successively illuminate various layers of the object, each layer preferably lying perpendicular to the optical axis of the image sensor.

Step 110: Acquiring Images of the Object

In this step, one or more elementary images $I_1 \ldots I_n \ldots I_N$ of the object are acquired, at various depths. FIG. 3 schematically shows an acquisition configuration in which the focal plane of the image sensor is successively moved to various depths in the object, this corresponding to one preferred embodiment. The light source remains stationary. The image sensor acquires as many images as there are focal lengths, each focal length being associated with one depth dn in the object. Thus, elementary images $I_1 \ldots I_n \ldots I_N$, N corresponding to the number of elementary images are obtained. The elementary images $I_1 \ldots I_n \ldots I_N$ are associated with depths $d_1 \ldots d_n \ldots d_N$, respectively. Below, the elementary images are combined to form an acquired image denoted I: it is a question of a three-dimensional image of the object. The acquired image is discretized into voxels, referred to as image voxels I(r'), each image voxel being one pixel of an elementary image $I_n$ forming the acquired image I.

Alternatively, the image sensor has a fixed focal length and it is moved with respect to the object, so that the focal plane is successively moved to various depths $d_1 \ldots d_n \ldots d_N$ in the object.

Alternatively, the image sensor remains stationary and a light source that emits a narrow strip of light is used. The light source is then translated with respect to the object, preferably parallel to the optical axis. Thus, during each illumination, a layer of the object parallel to the focal plane of the image sensor is illuminated, the thickness of said layer being smaller than the separation between two successive depths $d_n$, $d_{n-1}$. The sensor acquires an image in each position of the light source. Various images respectively corresponding to various depths in the object are thus formed in succession.

Generally, step 110 aims to obtain various images $I_1 \ldots I_n \ldots I_N$ representative of various depths $d_1 \ldots d_n \ldots d_N$ in the object. Acquiring images with focal planes placed at various depths makes it possible to obtain images in which the fluorescent sources, in the object, appear more clearly. This allows a more accurate reconstruction to be obtained.

The following steps are implemented by the processing unit 20. The latter comprises a microprocessor connected to a memory. The memory contains instructions allowing the processing described below to be carried out. The memory of the processing unit contains the image I acquired in step 110.

Step 120: Initialization

In this step, the spatial distribution of fluorescence in the object is initialized. Each term F(r) takes a randomly determined or predefined initial value $F^0(r)$.

Steps 130 to 250 described below are carried out iteratively.

Steps 130 to 150 aim to estimate, for each image voxel r', a reconstructed intensity $I^x(r')$ of each image voxel r' of the acquired image I. x is an integer corresponding to each iteration rank. On account of the fact that it is not possible to employ an explicit direct model, such as expressed by (7), each reconstructed intensity $I^x(r')$ is estimated using a statistical approach.

Step 130: defining complex emission amplitudes in each object voxel based on the initial emission distribution $F^0$ or on an emission distribution resulting from a preceding iteration $F^x$.

In this step, the rank of the iteration is incremented. A fluorescence distribution $F^x$ resulting either from the initialization, or from a preceding iteration, is employed. The objective of the iterations is to update the fluorescence distribution so as to obtain, following each iteration x, a fluorescence distribution $F^x$. The fluorescence distribution $F^x$ is defined for each object voxel r. Each term $F^x(r)$ of the fluorescence distribution corresponds to a fluorescence intensity in the object voxel r.

Sub-Step 131: Assigning Phase Values to Each Object Voxel.

As indicated above, fluorescence emission is an incoherent effect. Two point fluorescent light sources respectively placed in two different object voxels respectively emit two incoherent fluorescence light waves, even if the exciting light is a coherent light wave. In order to take into account the incoherence of the emissions of the object voxels, a random phase value $\Phi_{r,w}$, is assigned to each object voxel r. w is a repetition rank described below.

Sub-Step 132: Assigning a Wavelength

In this step, a fluorescence wavelength $\lambda$ is assigned to each object voxel. Preferably, the fluorescence wavelength $\lambda$ is assigned taking into account the emission probability $P^\lambda$ in the emission spectral band, which is defined by the probability distribution P, the latter being, in this example, considered to be Gaussian.

Sub-step 132 is optional. It is implemented if it is desired to take into account a certain width of the emission spectral band, this making the model more realistic.

Sub-steps 131 and 132 make it possible to define, depending on $F^x$, for each object voxel, a complex fluorescence-emission amplitude $s_{w,\lambda}^x(r)$ such that:

$$s_{w,\lambda}^x(r) = \sqrt{F^x(r)}\, e^{i\Phi_{r,w}} \tag{8}$$

The complex fluorescence-emission amplitude corresponds to the complex amplitude of a fluorescence light wave emitted by object voxel r.

Step 140: Propagation

In this step, an algorithm modelling propagation of the light is applied, this algorithm allowing a complex fluorescence-emission amplitude $s_{w,\lambda}^x(r)$ corresponding to a fluorescence source located in object voxel r to be modelled. The light wave emitted by each object voxel r propagates through the object 10, to the image sensor 15.

The propagation-modelling algorithm is based on propagation of a coherent light wave, according to expressions (2) and (3). One important aspect of the invention is that the incoherent nature of the emissions from each object voxel is accounted for in sub-step 131, in which a random phase is assigned to each object voxel. Likewise, the non-monochromatic nature of the light emission, from each voxel, is accounted for in sub-step 132.

For each image voxel, it is possible to estimate a complex amplitude such that:

$$u_{w,\lambda}^x(r') = \int G(r',r) s_{w,\lambda}^x(r)\, dr \tag{9}$$

Taking into account the discretization of the object into object voxels, this expression may be written in matrix form:

$$U = GS_w^x \tag{9'}$$

where

U is a vector each term of which is $u_{w,\lambda}^x(r')$, $S_w^x$ is a vector each term of which is $s_{w,\lambda}^x(r)$;

G is a transfer matrix each term of which is equal to $G^\lambda(r', r)$.

Expression (9') cannot be solved analytically, because the matrix G would need to be too large.

The value of $u_{w,\lambda}^x(r')$, in each image voxel, is approximated using a BPM propagation-modelling algorithm, BPM standing for beam propagation method. This type of algorithm is known to those skilled in the art, and allows propagation of light to be simulated using a one-way propagation model. The propagation-modelling algorithm may be applied stepwise, so as to model, in each object voxel, an entering complex amplitude and an exiting complex amplitude of the fluorescence light wave propagating through the voxel.

FIG. 4 schematically shows one implementation of such an algorithm. The object voxels are distributed in layers, each layer being assigned an index k. k=1 corresponds to the deepest layer. The algorithm makes it possible to model propagation of the complex amplitude between voxels located at a depth k+1 in the object to voxels located at a depth k in the object.

If:

$u_{w,k}^{x,-}(r)$ designates the complex amplitude of the light wave incident on an object voxel r of layer k;

and if $u_{w,k}^{x,+}(r)$ designates the complex amplitude of the light wave propagating from object voxel r of layer k to an adjacent voxel of layer k+1, in a propagation direction;

in the absence of emission of fluorescence light in each voxel of layer k, $u_{w,k}^{x,+}(r)$ is such that:

$$u_{w,k}^{x,+}(r) = u_{w,k}^{x,-}(r) \cdot e^{\frac{2i\pi \cdot \delta n_k(r) \Delta z}{\lambda}} \tag{10}$$

$$\delta n_k(r) = n_k(r) - n_0 \tag{10'}$$

$n_0$ is an average index of the object: it is either measured or predetermined. For example, in the case of a biological object, $n_0 = 1.33$.

$\Delta z$ corresponds to the thickness of the voxel r.

The fact that the term $n_k(r)$ is taken into account shows that the propagation algorithm allows a variation in refractive index in the object to be taken into account.

On the basis of $u_{w,k}^{x,+}(r)$, obtained in (10), it is possible to estimate $u_{w,k}^{x,-}$, relative to the voxel of rank k+1, using:

$$u_{w,k+1}^{x,-} = u_{w,k}^{x,+}(r) * H_{\Delta z}^\lambda \tag{11}$$

Expression (11) may be expressed in the frequency domain: $TF[u_{w,k+1}^{x,-}(r)] = TF[u_k^+(r)] \odot H_{\Delta z}^\lambda$ (11'), TF designating an operator that returns the Fourier transform, with $$H_{\Delta z}^\lambda(\mu) = \exp\left(i 2\pi \Delta z \sqrt{\frac{n_0^2}{\lambda^2} - \mu^2}\right) \tag{12}$$

where $\mu$ corresponds to a coordinate r expressed in the spatial-frequency domain.

When the object voxel r contains a source $s_{w,\lambda}^x(r)$ of fluorescence emission, determined by the fluorescence distribution $F^x$, expression (11') becomes, $$TF[u_{w,k}^{x,-}(r)] = TF\left[u_{w,k}^{x,+}(r)\right] \odot H_{\Delta z}^\lambda + \frac{TF[s_{w,\lambda}^x(r)]}{C} \quad (13)$$

where $s_{w,\lambda}^x(r)$ is as defined with respect to (8) and $$C = \sqrt{1 - \frac{\lambda^2 \mu^2}{n_o^2}}. \quad (13')$$

It is thus possible to compute propagation of the complex amplitude $(u_{w,k=1}^{x,-}(r) \to u_{w,k=1}^{x,+}(r) \to u_{w,k=2}^{x,-}(r) \to u_{w,k=2}^{x,+}(r) \ldots \to u_{w,k=K}^{x,-}(r) \to u_{w,k=K}^{x,+}(r))$ where K corresponds to the total number of layers considered in the BPM. When the surface $10_s$ of the object is reached, the light wave propagates freely to the optical system, then from the optical system to the image sensor.

In this step, the complex amplitude $u_{w,\lambda}^x(r)$ of the fluorescence light wave propagating, stepwise, through each voxel of the object, is estimated. The light wave $u_{w,k=K}^{x,+}(r)$ emanating from each voxel of the last layer of the object is then propagated to the optics, then to the image sensor. In this model, the optical field emanating from the object results solely from the fluorescence sources $s_{w,\lambda}^x(r)$ found in each voxel of the object, and is according to the fluorescence distribution $F^x$. The field incident on the object, i.e. incident on layer k=1, may be considered to be zero.

Following step 140, an estimate of the complex amplitude $u_{w,\lambda}^x(r')$ in each image voxel r' is obtained.

Step 150: Repeating Steps 130 and 140, W being an Integer Designating the Number of Repetitions. W is for Example Equal to 1000.

Following step 150, W complex-amplitude values $u_{w,\lambda}^x(r')$ will have been obtained for each image voxel. Each complex amplitude $u_{w,\lambda}^x(r')$ models one complex-amplitude wave of the light wave detected by the image voxel r' given the fluorescence distribution $F^x$ resulting from the preceding iteration and given the phase and wavelength distributions taken into account in steps 131 and 132.

Step 160: Obtaining a Reconstructed Image $I^x$

On the basis of the W complex-amplitude values $u_{w,\lambda}^x(r')$, an intensity, referred to as the reconstructed intensity $I^x(r')$, is estimated for each image voxel. The reconstructed intensity is obtained by finding a mean of the squares of the moduli of the W complex amplitudes $u_{w,\lambda}^x(r')$ resulting from step 150. Thus, $$I^x(r') = |\overline{u}_\lambda^x(r')|^2 = \frac{1}{W} \sum |u_{w,\lambda}^x(r')|^2 \quad (14)$$

All of the values $I^x(r')$ together form a reconstructed image $I^x$.

Steps 130 to 150 make it possible to obtain, statistically, the reconstructed image $I^x$ such that $$I^x \approx L F^x \quad (15).$$

The symbol $\approx$ means "approaching".

In (15), the reconstructed image $I^x$ is expressed vectorially, through concatenation of image voxels. Likewise, $F^x$ is expressed in vector form, through concatenation of object voxels.

The transfer matrix L is not determined analytically. It is implicit, being approached via the successive propagations of step 140, the results of which propagations are then averaged in step 160. In other words, steps 140 to 160 are equivalent to defining the transfer matrix L. An explicit definition of L is replaced by a mean of w repetitions of steps 140 and 150.

Step 170: Defining Complex Amplitudes in Each Image Voxel of the Reconstructed Image $I^x$.

In this step, a reconstructed intensity is determined for each image voxel of the reconstructed image. The reconstructed intensity of each image voxel corresponds to the $I^x(r')$ resulting from step 160.

Sub-Step 171: Assigning Phase Values to Each Image Voxel r' of the Reconstructed Image.

Analogously to step 131, a random phase value $\Phi_{r',w'}$ is assigned to each image voxel. w' is a repetition rank described below.

Sub-Step 172: Assigning a Wavelength

Analogously to step 132, an emission wavelength is assigned to each image voxel. The emission wavelength is assigned taking into account the emission probability $P^\lambda$ in the emission spectral band, which is defined by the probability distribution P. Just like sub-step 132, sub-step 162 is optional.

Sub-steps 171 and 172 make it possible to define, for each image voxel r', a complex amplitude $u_{w,\lambda}^x(r')$ such that:

$$u_{w',\lambda}^x(r') = \sqrt{I^x(r')} e^{i\Phi_{r',w'}}. \quad (16)$$

Each complex amplitude $u_{w,\lambda}^x(r')$ is computed based on the reconstructed image $I^x$ resulting from step 160. Each complex amplitude corresponds to an amplitude of a light wave detected in image voxel r'.

Step 180: Back-Propagation

In this step, an algorithm modelling back-propagation of the light is applied, this algorithm allowing back-propagation of a light wave from the image sensor to each object voxel r to be modelled. It is a question of determining a set of values of complex fluorescence-emission amplitudes $s_{w',\lambda}^x(r)$, in each object voxel, explaining each complex amplitude resulting from step 170.

The back-propagation-modelling algorithm is analogous to the algorithm implemented in step 140, i.e. it is a BPM algorithm. It makes it possible to estimate $s_{w',\lambda}^x(r)$, such that $$s_{w',\lambda}^x(r) = \int G^{\lambda H}(r,r') u_{w',\lambda}^x(r') dr' \quad (17)$$

where H designates the Hilbert operator.

Following back-propagation, a complex fluorescence-emission amplitude $s_{w',\lambda}^x(r)$ is obtained for each object voxel. This amounts to performing, via modelling, the matrix operation:

$$s_{w',\lambda}^x = G^{\lambda H} U^x \quad (18)$$

where:

$s_{w',\lambda}^x$ is a vector each term of which is equal to an estimated amplitude of a fluorescence light wave $s_{w',\lambda}^x(r)$ emitted by each object voxel; $s_{w',\lambda}^x$ is obtained by back-propagation of $I^x$.

$U^x$ is a vector each term of which is equal to a fluorescence amplitude detected in each image voxel $u_{w',\lambda}^x(r')$, based on the reconstructed image $I^x$; $G^{\lambda H}$ is a transfer matrix, each term of which is $G^{\lambda H}(r, r')$.

The transfer matrix $G^{\lambda H}$ cannot be instantiated, because it would be too large in size. The back-propagation-modelling algorithm allows $s_{w',\lambda}^x$ to be estimated from $U^x$.

Step 190: Repeating Steps 170 and 180, W' being an Integer Designating the Number of Repetitions. W' is for Example Equal to 1000.

Following step 190, W' complex-emission-amplitude values $s_{w',\lambda}^x(r')$ will have been obtained for each object voxel.

Step 200: Estimating an Emission Intensity Corresponding to the Reconstructed Image $I^x$.

On the basis of the W' squares of the moduli of the complex amplitudes $s_{w',\lambda}^x(r)$ resulting from step 190, it is possible to estimate, for each object voxel, a fluorescence emission intensity $S_f^x(r)$ corresponding to the reconstructed image $I^x$.

$$S_{f^x}^x(r) = \frac{1}{W'} \sum_{w'} |s_{w',\lambda}^x(r)|^2 \qquad (19)$$

The transfer matrix $L^T$ is not determined analytically, but estimated via the propagations of step 190, the results of which propagations are then averaged in step 210. In other words, steps 180 to 210 are equivalent to defining the transfer matrix $L^T$. The notation $S_f^x(r)$ expresses the fact that it is an estimate of $S(r)$ in the iteration of rank x, said estimate being based on the reconstructed image $I^x$.

If $S_{f^x}^x$ corresponds to a vector each term of which is equal to $S_f^x(r)$, then:

$$S_{f^x}^x \approx L^T I^x \qquad (20)$$

and, given that $I^x \approx LF^x$, $$S_{f^x}^x \sim L^T LF^x \qquad (21)$$

Steps 210 to 240 described below are equivalent to steps 170 to 200. Whereas steps 170 to 200 allow back-propagation of the reconstructed image $I^x$, steps 210 to 240 back-propagate, using the same approach, the acquired image I. Whereas the reconstructed image $I^x$ results from a reconstruction algorithm, and therefore corresponds to a simulation, the acquired image I corresponds to the measured data.

Step 210. Defining Complex Amplitudes in Each Image Voxel r' of the Acquired Image I.

Sub-Step 211: Assigning Phase Values to Each Image Voxel of the Acquired Image I.

Analogously to steps 131 and 171, a random phase value $\Phi_{r',w''}$ is assigned to each image voxel I(r'). w'' is a repetition rank.

Sub-Step 212: Assigning a Wavelength

Analogously to steps 132 and 172, an emission wavelength $\lambda$ is assigned to each image voxel. The emission wavelength is assigned taking into account the emission probability P in the emission spectral band, which is defined by the probability distribution P. Sub-step 212 is optional.

Sub-steps 211 and 212 make it possible to define, for each image voxel r', a complex amplitude $u_{w'',\lambda}^x(r')$ such that:

$$u_{w'',\lambda}^x(r') = \sqrt{I(r')}\, e^{i\Phi_{r',w''}} \qquad (22)$$

Step 220: Back-Propagation

In this step, an algorithm modelling back-propagation of the light is applied, this algorithm allowing a complex amplitude propagating from the image sensor to each object voxel r to be modelled. It is a question of determining a set of values of complex fluorescence-emission amplitudes $s_{w,\lambda}^x(r)$, in each object voxel, explaining the acquired image I resulting from step 120.

The back-propagation-modelling algorithm is analogous to the algorithm implemented in step 180. It makes it possible to estimate $s_{w'',\lambda}^x(r)$, such that $$s_{w'',\lambda}^x(r) = \int G^{\lambda,H}(r,r') u_{w'',\lambda}^x(r')dr' \qquad (23)$$

where H designates the Hilbert operator.

Following back-propagation, a complex fluorescence-emission amplitude I corresponding to the acquired image I is obtained for each object voxel.

Step 230: Repeating Steps 210 and 220, W''' being an Integer Designating the Number of Repetitions. W''' is for Example Equal to 1000.

Following step 200, W''' complex-amplitude values $s_{w'',\lambda}^x(r)$ will have been obtained for each object voxel.

Step 240: Estimating an Emission Intensity Corresponding to the Acquired Image.

On the basis of the W''' complex-amplitude values $s_{w'',\lambda}^x(r)$ resulting from step 230, it is possible to estimate, for each object voxel, a fluorescence emission intensity $S_I^x(r)$ corresponding to the acquired image I. The emission intensity may be obtained by finding a mean of the squares of the moduli of the W''' complex amplitudes $s_{w'',\lambda}^x(r)$ resulting from step 230

$$S_I^x(r) = \frac{1}{W''} \sum_{w''} |s_{w'',\lambda}^x(r)|^2 \qquad (24)$$

The notation $S_I^x(r)$ expresses the fact that it is an estimate of $S_I^x(r)$ in the iteration of rank x, said estimate being based on the acquired image I.

If $S_I^x$ takes the form of a vector each term of which is equal to $S_I^x(r)$, then:

$$S_I^x \approx L^T I \qquad (25)$$

Step 250: Updating

In step 250, the fluorescence distribution $F^x$ is updated according to the expression:

$$F^{x+1} \leftarrow F^x \frac{L^T I}{L^T L F^x} \qquad (26)$$

Thus, each term $F^{x+1}(r)$ is updated such that:

$$F^{x+1}(r) \leftarrow F^x(r) \frac{S_I^x(r)}{S_{f^x}^x(\gamma)} \qquad (27)$$

The operator $\leftarrow$ is "is replaced by".

Expression (26) corresponds to an update achieved via non-negative matrix factorization (NMF).

Step 260: Reiterating Steps 130 to 250. The Criterion of Stoppage of the Iterations May be a Predetermined Number of Iterations or a Small Enough Difference Between Two Successive Vectors $F^x$ Before and After the Update.

According to one variant, steps 170 to 200 consist not in back-propagation of the reconstructed image $I^x$, but rather of a differential image representative of a comparison between the reconstructed image $I^x$ and the acquired image I. In step 170, a differential image $\Delta I^x$ is defined such that $$\Delta I^x = \|I - I^x\|^2 \qquad (28)$$

Steps 171 and 172 are implemented in a similar way to the way described above, so as to define, for each image voxel r', a complex amplitude referred to as the differential complex amplitude, $u_{w',\lambda}^x(r')$ such that:

$$u_{w',\lambda}(r') = \sqrt{\Delta I^x(r')}\, e^{i\Phi_{r',w'}} \quad (29)$$

Step 180 described above is carried out using, by way of input data, differential complex amplitudes $u_{w',\lambda}^x(r')$ such as described in (29). Thus, a differential amplitude $\Delta s_{w',\lambda}^x$ allowing the differential image $\Delta I^x$ to be explained is obtained for each object voxel, the differential amplitude corresponding to a differential fluorescence emission.

Step 190 is implemented, so as to achieve W' repetitions of steps 170 and 180.

Step 200 is performed, by computing, for each object voxel, a mean $\Delta \bar{s}_\lambda^x(r)$ of the W' squares of the moduli of the differential amplitudes $\Delta s_{w',\lambda}^x(r)$.

It is thus possible to obtain, for each voxel a differential intensity such that:

$$\Delta S^x(r) = |\Delta \bar{s}_\lambda^x(r)|^2 = \frac{1}{W'} \sum_{w'} |\Delta s_{w',\lambda}^x(r)|^2 \quad (30)$$

In this embodiment, steps 210 to 240 are not implemented. In step 250, the update formula consists in defining a value of $F^{x+1}$ allowing the norm, for example the L2 norm, of the vector $\Delta S^x$. to be decreased. The optimization algorithm may be a gradient-descent algorithm. It allows a fluorescence distribution $F^x$ that is used in a reiteration of steps 130 to 200 and 250 to be determined.

The inventor considers that it is preferable for an FMN update formula to be used.

Whatever the embodiment, following the last iteration, a fluorescence-intensity distribution, corresponding to the vector $F^x$ resulting from the last iteration, is obtained.

It is known that a fluorescence intensity corresponds to a fluorescence yield $\eta(r)$ multiplied by an excitation light intensity. The excitation light intensity $U_{ex}(r)$ corresponds to the intensity of the illuminating light wave reaching each object voxel during step 110. If $U_{ex}(r)$ is known for each object voxel, from each term $F^x(r)$ of the vector $F^x$, it is possible to estimate q(r) using the expression:

$$\eta(r) = \frac{F^x(r)}{U_{ex}(r)} \quad (31)$$

This makes it possible to obtain a map of the fluorescence $\eta$ in each voxel of the object. The fluorescence map is independent of the illumination. It corresponds to an amount of fluorophore in each object voxel of the object. The fluorescence map $\eta$ is a vector defined for each object voxel.

The inventor has implemented the method described with reference to steps 100 to 250, using an FMN update formula.

The dimensions of the object were:
width and length along the axes X and Y: 150 µm;
thickness along Z: 200 µm;
refractive index: 1.33, except in a ball of 30 µm radius centred on (0, 0, −40 µm), in which the refractive index was equal to 1.33+0.05, the origin of the coordinate system being the centre of the object;
positions of the sources of fluorescence: two point sources at (0, 0, −80 µm) and (0, 30, −80 µm);
fluorescence spectrum: Gaussian distribution centred on the wavelength of 0.505 µm and of 0.020 µm spectral width;
voxel mesh: $\Delta x=0.14$ µm; $\Delta y=0.14$ µm; $\Delta z=2$ µm.

Fluorescence images were acquired at various depths, with a spatial step size of $\Delta z=2$ µm: 50 images were thus acquired from $z=-100$ µm to $z=0$ µm.

FIG. 5A shows the spatial distribution of refractive indices in the object. I$_n$ FIG. 5A, two point sources (s) and the ball of 30 µm radius that induces an index variation $\delta n$ have been shown.

FIG. 5B shows the intensity of a fluorescence light wave propagating through each object voxel. Each value shown in FIG. 5B is $$U^x(r) = |\overline{u}_\lambda^x(r)|^2 = \frac{1}{W}\sum_{w} |u_{w,\lambda}^x(r)|^2 \quad (32)$$

with $u_{w,\lambda}^x(r) = u_{w,k}^{x,+}(r)$ for each layer k in the object.

$u_{w,\lambda}^x(r)$ corresponds to the amplitude of a complex light wave propagating through each object voxel, $u_{w,\lambda}^x(r)$ being estimated via the BPM propagation model described with respect to step 140. Thus, FIG. 5B corresponds to a section, parallel to the XZ-plane, of the implementation of the propagation-modelling algorithm.

FIG. 5C corresponds to a section of each acquired fluorescence image, parallel to an XZ-plane, between the depths $z=-100$ µm and $z=0$ µm. The numerical aperture of the measuring system (sensor+optical system) was 0.4. On account of the non-uniformity of the refractive indices inside the object, the fluorescence measurement was observed to be shifted along the Z-axis. In FIG. 5C, the vertical strip corresponds to the actual position along the Z-axis.

FIG. 5D shows a section of a fluorescence-emission distribution $F^x$ obtained by FMN after 20 iterations. It may be seen that the Z-wise position of the sources has been re-established with respect to the position indicated by the measured images. The method thus makes it possible to take into account the non-uniformity in refractive index, to locate the sources of emission of fluorescence light.

In each iteration, a criterion of fit to the data Ex, corresponding to a difference between the reconstructed image ($\tilde{I}^x \approx LF^x$) and the acquired image (I), is computed.

$$\varepsilon^x = \|I - LF^x\|^2 \quad (33)$$

FIG. 5E shows the variation in the criterion $\varepsilon^x$ (y-axis) as a function of the rank x of each iteration. (x-axis).

In each iteration, the sum of the light wave intensity in each plane lying parallel to the Z-axis, between $-100$ µm and 0 µm, is computed. It is a question of the sum of each term $F^x(r)$ for object voxels lying at the same depth Z. FIG. 5F shows a profile of the intensities for each layer, in each iteration. The x-axis corresponds to a coordinate of each layer along the Z-axis, and the y-axis shows the sum $F^x(r)$ for each depth along the Z-axis. On initialization, the distribution $F^x$ was uniform, this corresponding to curve "0". As the iterations progress, the integral "peaks" in the plane containing the sources of fluorescence. The iteration rank has been indicated for certain profiles. The greater the number of iterations performed, the more the profile peaks and tends to shift along the Z-axis.

The invention will be able to be implemented on biological tissues, for diagnostic purposes. It will also be able to be implemented, in microscopy, in applications related to cellular culture or to the culture of micro-organisms, in culture media, given a sufficient transmittance with respect to the illuminating light and fluorescence light. More generally, the invention may be applied to the analysis of solid objects, liquid objects or objects taking the form of gels, in the food-processing industry or in other industrial fields.

The invention claimed is:

1. A method for reconstructing a three-dimensional spatial distribution of fluorescence inside an object, the object being capable of emitting fluorescence light under an effect of illumination in an excitation spectral band, the object being discretized into object voxels, wherein:
   each object voxel of the object voxels is capable of emitting light in a fluorescence spectral band;
   the three-dimensional spatial distribution of fluorescence inside the object defines an intensity of emission of fluorescence light in each object voxel of the object voxels;
   the method comprising the following steps:
   a) placing the object facing an image sensor, the image sensor being configured to form an image in an object focal plane, the object focal plane being configured to lie successively at various depths in the object;
   b) illuminating the object in the excitation spectral band, and successively acquiring a plurality of elementary images, the object focal plane respectively lying at the various depths in the object, each elementary image of the plurality of elementary images being divided into pixels, to each pixel of the pixels corresponding one measured intensity value, the plurality of elementary images being combined to form a three-dimensional acquired image, each pixel of an elementary image forming one image voxel of the three-dimensional acquired image;
   c) initializing the three-dimensional spatial distribution of fluorescence inside the object, so as to form an initialized three-dimensional spatial distribution of fluorescence inside the object;
   d) taking into account the initialized three-dimensional spatial distribution of fluorescence inside the object or the three-dimensional spatial distribution of fluorescence inside the object resulting from a preceding iteration;
   e) assigning a random phase value to each object voxel of the object voxels, and implementing an algorithm modelling a propagation of light through the object, so as to estimate a complex amplitude of the light detected by each image voxel;
   f) repeating step e) W times, W being a positive integer, so as to obtain, for each image voxel, W complex-amplitude estimates;
   g) for each image voxel, on a basis of the W complex-amplitude estimates resulting from step f), computing a reconstructed intensity, all of reconstructed intensities of each image voxel together forming a three-dimensional reconstructed image;
   h) optionally forming a differential image, the differential image corresponding to a comparison between the three-dimensional reconstructed image and the three-dimensional acquired image;
   i) assigning a random phase value to each image voxel of the three-dimensional reconstructed image resulting from step g) or of the differential image resulting from step h), and implementing an algorithm modelling a back-propagation of light through the object, so as to obtain, for each object voxel of the object voxels:
      a complex fluorescence-emission amplitude corresponding to the three-dimensional reconstructed image resulting from step g); or
      a complex differential fluorescence-emission amplitude corresponding to the differential image resulting from step h);
   j) repeating step i) W' times, W' being a positive integer, so as to obtain, for each object voxel of the object voxels, W' complex-amplitude estimates corresponding to the three-dimensional reconstructed image or W' complex-amplitude estimates corresponding to the differential image;
   k) on a basis of the W' complex-amplitude estimates resulting from step j), computing, for each object voxel of the object voxels, an emission intensity or a differential emission intensity;
   l) updating the three-dimensional spatial distribution of fluorescence inside the object on a basis of the emission intensity or of the differential emission intensity computed for each object voxel of the object voxels of the object in step k); and
   m) reiterating steps d) to l) until a criterion of stoppage of iterations is met.

2. The method according to claim 1, further comprising, in each iteration of steps d) to l), the following steps:
   i-a) assigning a random phase value to each image voxel of the three-dimensional acquired image formed in step b), and implementing an algorithm modelling a back-propagation of light through the object, so as to estimate, for each object voxel of the object voxels, a complex fluorescence-emission amplitude corresponding to the three-dimensional acquired image;
   j-a) repeating step i-a) W" times, W" being a positive integer, so as to obtain, for each object voxel of the object voxels, W" estimates of complex fluorescence-emission amplitudes corresponding to the three-dimensional acquired image; and
   k-a) on a basis of the W" estimates of complex fluorescence-emission amplitudes resulting from step j-a), computing an emission intensity, for each object voxel of the object voxels, corresponding to the three-dimensional acquired image;
   wherein in step l), the updating the three-dimensional spatial distribution of the fluorescence inside the object is carried out on a basis of a ratio, computed for each object voxel of the object voxels, between the emission intensity corresponding to the three-dimensional acquired image and an emission intensity corresponding to the reconstructed three-dimensional image.

3. The method according to claim 2, wherein, in each iteration of step i-a), the random phase value assigned to each image voxel of the three-dimensional acquired image corresponds to the random phase value assigned to the same image voxel of the three-dimensional reconstructed image in a step i) of the same iteration.

4. The method according to claim 2, wherein, in each step k-a), for each object voxel of the object voxels, the emission intensity is computed on a basis of a mean of squares of moduli of the W" estimates of complex fluorescence-emission amplitudes corresponding to the three-dimensional acquired image, for each object voxel of the object voxels, in step i-a).

5. The method according to claim 1, wherein:
   in step h), the differential image is a quadratic difference between the three-dimensional reconstructed image and the three-dimensional acquired image;

step i) comprises obtaining, for each image voxel, a complex differential fluorescence-emission amplitude computed on a basis of the differential image;

step k) comprises computing a differential emission intensity, for each object voxel of the object voxels, corresponding to the differential image formed in step h); and in step l), the three-dimensional spatial distribution of fluorescence inside the object is updated so as to minimize the differential emission intensity of the object voxels.

6. The method according to claim 1, wherein:

in step g), for each image voxel, the reconstructed intensity is computed on a basis of a mean of squares of moduli of the W complex-amplitude estimates obtained, for each image voxel, in step f); and in step k), for each object voxel of the object voxels, the emission intensity is computed on a basis of a mean of squares of moduli of the W' complex-amplitude estimates of obtained, for the image voxel, in step j).

7. The method according to claim 1, wherein:

in step e), a wavelength is assigned to each object voxel of the object voxels, in the fluorescence spectral band, the wavelength being assigned randomly or according to a predetermined probability distribution; and in step i), a wavelength is assigned to each image voxel, in the fluorescence spectral band, the wavelength being assigned randomly or according to a predetermined probability distribution.

8. The method according to claim 1, wherein the algorithm modelling h propagation of light through the object in step e) and the algorithm modelling h back-propagation of light through the object in step i) both employ a one-way propagation model, of BPM type, BPM standing for a beam propagation method, so as to determine light propagating through an object voxel of the object voxels on a basis of light propagating from an adjacent object voxel.

9. The method according to claim 8, wherein:

a refractive index of the object varies between two different object voxels; and the algorithm modelling h propagation of light through the object and the algorithm modelling the back-propagation of light through the object account for a variation in a refractive index between two adjacent object voxels.

10. A device for observing an object, the device comprising:

an image sensor, configured to form an image in an object plane, a distance between the image sensor and the object plane being variable;

a light source, configured to illuminate an object; and a processing unit, configured to receive images acquired by the image sensor, and to implement steps c) to m) of the method according to claim 1.

11. A non-transitory storage medium able to be read by a computer or able to be connected to a computer, the non-transitory storage medium storing a program, when executed by the computer, to implement steps c) to m) of the method according to claim 1 on a basis of images formed by the image sensor at various depths in the object.

* * * * *